(12) United States Patent
Yang et al.

(10) Patent No.: US 9,972,836 B2
(45) Date of Patent: May 15, 2018

(54) SIOX/SI/C COMPOSITE MATERIAL AND PROCESS OF PRODUCING THEREOF, AND ANODE FOR LITHIUM ION BATTERY COMPRISING SAID COMPOSITE MATERIAL

(71) Applicants: Robert Bosch GmbH, Stuttgart (DE); Shanghai Jiaotong University, Shanghai (CN)

(72) Inventors: Jun Yang, Shanghai (CN); Xuejiao Feng, Shanghai (CN); Jingjun Zhang, Shanghai (CN); Longjie Zhou, Shanghai (CN); Yuqian Dou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 14/787,431

(22) PCT Filed: Apr. 27, 2013

(86) PCT No.: PCT/CN2013/074886
§ 371 (c)(1),
(2) Date: Oct. 27, 2015

(87) PCT Pub. No.: WO2014/172914
PCT Pub. Date: Oct. 30, 2014

(65) Prior Publication Data
US 2016/0079591 A1    Mar. 17, 2016

(51) Int. Cl.
*H01M 4/36* (2006.01)
*H01M 10/0525* (2010.01)
*H01M 4/1395* (2010.01)
*H01M 4/38* (2006.01)
*H01M 4/48* (2010.01)
*C04B 35/626* (2006.01)
*C04B 35/628* (2006.01)
*H01M 4/04* (2006.01)
*H01M 4/583* (2010.01)
*H01M 4/1391* (2010.01)
(Continued)

(52) U.S. Cl.
CPC ....... *H01M 4/366* (2013.01); *C04B 35/62615* (2013.01); *C04B 35/62839* (2013.01);
(Continued)

(58) Field of Classification Search
None
See application file for complete search history.

(56) References Cited

U.S. PATENT DOCUMENTS

2005/0233213 A1    10/2005    Lee et al.
2009/0029256 A1    1/2009    Mah et al.
(Continued)

FOREIGN PATENT DOCUMENTS

CN    102208634 A    10/2011
CN    102593426 A    7/2012
(Continued)

OTHER PUBLICATIONS

English machine translation of JP 2007294423 obtained Jun. 20, 2017 from the JPO website.*
(Continued)

*Primary Examiner* — Sarah A. Slifka
(74) *Attorney, Agent, or Firm* — Maginot, Moore & Beck LLP (57) ABSTRACT

An SiOx/Si/C composite material, includes SiOx/Si composite particles and a carbon coating layer coated on the SiOx/Si composite particles. The SiOx/Si composite particles include nano-silicon crystallites embedded in an SiOx (0<x≤2) amorphous matrix phase. The SiOx/Si composite particles have an Si:O molar ratio of 5:1-1.1:1, preferably 2:1-1.2:1. A process for producing an SiOx/Si/C composite material, includes a) milling SiO powder together with a metal reductant in a molar ratio of 125:1-10:1, preferably 2:11-5:1, b) totally removing the oxidation product of the metal reductant to obtain SiOx/Si composite particles, and c) coating the SiOx/Si composite particles with carbon to obtain the SiOx/Si/C composite material.

6 Claims, 9 Drawing Sheets

(51) Int. Cl.
*H01M 4/587* (2010.01)
*H01M 4/62* (2006.01)

(52) U.S. Cl.
CPC .. *C04B 35/62884* (2013.01); *C04B 35/62897* (2013.01); *H01M 4/0428* (2013.01); *H01M 4/1395* (2013.01); *H01M 4/362* (2013.01); *H01M 4/364* (2013.01); *H01M 4/386* (2013.01); *H01M 4/48* (2013.01); *H01M 4/483* (2013.01); *H01M 4/583* (2013.01); *H01M 10/0525* (2013.01); *C04B 2235/3418* (2013.01); *C04B 2235/401* (2013.01); *C04B 2235/428* (2013.01); *C04B 2235/5436* (2013.01); *C04B 2235/5472* (2013.01); *H01M 4/1391* (2013.01); *H01M 4/587* (2013.01); *H01M 4/625* (2013.01); *H01M 2220/30* (2013.01)

(56) References Cited

U.S. PATENT DOCUMENTS

| | | |
|---|---|---|
| 2010/0009261 A1 | 1/2010 | Watanabe |
| 2010/0243951 A1 | 9/2010 | Watanabe et al. |
| 2011/0085960 A1 | 4/2011 | Mukasyan et al. |
| 2012/0107679 A1 | 5/2012 | Taniguchi et al. |

FOREIGN PATENT DOCUMENTS

| | | |
|---|---|---|
| CN | 102800851 A | 11/2012 |
| EP | 2 372 816 A1 | 10/2011 |
| JP | 2007294423 * | 11/2007 |
| JP | 2009-205950 A | 9/2009 |
| JP | 2010-21100 A | 1/2010 |
| JP | 2011-222151 A | 11/2011 |

OTHER PUBLICATIONS

International Search Report corresponding to PCT Application No. PCT/CN2013/074886, dated Jan. 30, 2014 (5 pages).

Liu et al.; Nano-porous SiO/Carbon Composite Anode Material for Lithium-Ion Batteries; Journal of Applied Electrochemistry; Sep. 2009; pp. 1643-1649; vol. 39, Issue 9; Springer Netherlands.

Kim et al.; Enhanced cycle performance of SiO—C composite anode for lithium-ion batteries; Journal of Power Sources; Mar. 8, 2007; pp. 456-459; Elsevier B.V.; www.sciencedirect.com.

Zheng et al.; Study of Nano-porous Si/Graphite/C Composite Anode Materials for Li-ion Batteries; Chinese Journal of Inorganic Chemistry; Nov. 2007; pp. 1882-1886; vol. 23, Issue 11; China Academic Journal Electronic Publishing House; www.cnki.net.

* cited by examiner

SIOX/SI/C COMPOSITE MATERIAL AND PROCESS OF PRODUCING THEREOF, AND ANODE FOR LITHIUM ION BATTERY COMPRISING SAID COMPOSITE MATERIAL

This application is a 35 U.S.C. § 371 National Stage Application of PCT/CN2013/074886, filed on Apr. 27, 2013, the disclosure of which is incorporated herein by reference in its entirety.

The present invention relates to a process for producing a SiOx/Si/C composite material composite material. In particular, the present invention relates to a process for producing a SiOx/Si/C composite material for an anode of lithium ion battery. The present invention also relates to a SiOx/Si/C composite material manufactured by the said process and the use thereof in lithium ion battery. In addition, the present invention further relates to a composite material and the use thereof in the producing of SiOx/Si/C composite materials.

BACKGROUND

Lithium ion batteries (LIB) are widely used as the ubiquitous power source for portable electronic devices, such as cell phones and laptop computers. Graphite is the most widely used negative electrode material for the rechargeable lithium ion batteries. However, the energy density of graphite is relative low, i.e. only 372 mAh $g^{-1}$. To further enhance the energy density of lithium ion batteries, researchers focus on silicon based anode materials due to their high lithium storage capacity. However, the main problem of these materials is pulverization and loss of electronic conductivity of the electrode resulted from huge volumetric change during lithiation/delithiation. To solve such a problem, nanosized and porous structured materials are chosen to buffer the volume expansion related to the alloying with lithium, and thereby overcome the mechanical failure of the electrode. Among the Si based anode materials investigated and explored, silicon monoxide (SiO) appears particularly promising because of its long cycle life and low cost. The better cycling performance of SiO is originated from the formation of lithium oxide and lithium silicate, acting as buffer layers to minimize the volume changes during the charging and discharging.

The volume expansion of SiO is about 200% upon electrochemical lithiation of about 2600 mAh $g^{-1}$, comparing with silicon, which is 400% for lithiation of 4000 mAh $g^{-1}$. Since the volume explain of SiO during lithiation is suppressed by the formation of lithium oxide ($Li_2O$) and lithium silicate ($Li_4SiO_4$), the high cycling performance of SiO could be easier to achieve than that of silicon. And for practical application, anode capacity of 1000-1500 mAh $g^{-1}$ would be enough for current cathode materials. Therefore, many research groups focus on SiO materials as anode of lithium ion battery, e.g. 1) Jae-Hun Kim et al reported a silicon monoxide/carbon composite prepared by ball-milling of SiO, following with a pyrolysis process. This composite shows a reversible capacity of 710 mAh $g^{-1}$ over 100 cycles (see Kim, J.-H., et al., *Enhanced cycle performance of SiO—C composite anode for lithium-ion batteries. Journal of Power Sources,* 2007. 170(2): p. 456-459); 2) Wei-Ren Liu et al reported that carbon-coating of sub-pm SiO particles by a fluidized-bed chemical-vapor-deposition process exhibited a capacity of 620mAh $g^{-1}$ after 50 cycles (see Liu, W.-R., et al., *Nano-porous SiO/Si/Carbon composite anode for lithium-ion batteries. Journal of Applied Electrochemistry,* 2009. 39(9): p. 1643-1649); and 3) Jung-In Lee et al reported a silicon-based muticomponent composite composed of porous silicon monoxide, silicon and silica which form from disproportionation reaction of porous silicon monoxide. This composite shows reversible capacity of 1500 mAh $g^{-1}$ with cycle life of 100 times.

It is well known that commercially available amorphous, solid SiO is technically prepared from Si and $SiO_2$ at high temperatures by condensation of gaseous SiO. The atomic structure of solid SiO is still controversial, despite a number of physical and chemical investigations has been conducted. In addition, the above prior arts disclose that the $SiO_2$ is unavoidable because of disproportionation reaction during the process for producing the SiO-based material. The formation of $SiO_2$ in solid SiO material badly damages the capacity of the material, because $SiO_2$ is inactive toward lithium ion, and therefore contributes no capacity for anode capacity. Moreover, $SiO_2$ decrease silicon content, which is the main contributor of anode capacity.

Accordingly, a need exists for an easy and cost-efficient process for producing a SiOx/Si/C material that exhibits larger capacity, a reduced content of $Li_2O$ and $Li_4SiO_4$ formed during lithiation process by adjusting the atom ratio of Si:O in the SiOx/Si/C composite material.

SUMMARY

In this invention, the inventors tried to embed a small amount of high reversible capacity nano-silicon into silicon monoxide via a partial reduction reaction between silicon monoxide (SiO) and a reductant under milling. As a result, the Si:O ratio of SiO material is increased, in other words, the oxygen content is reduced by the reduction reaction during milling process.

Accordingly, the capacity of the resulting SiOx/Si composite material is larger than those of the prior art results. In addition, content of $Li_2O$ and $Li_4SiO_4$ formed during lithiation process can be controlled so as to maximize the volume buffer effect at a controllable capacity cost.

Accordingly, provided herein is a SiOx/Si/C composite material, comprising SiOx/Si composite particles and a carbon coating layer coated on said SiOx/Si composite particles, wherein 0<x≤2, and said SiOx/Si composite particles have a Si:O molar ratio of 3:1-1.1:1, preferably 2:1-1.2:1.

In an embodiment of the invention, said SiOx/Si composite particles comprises nano-silicon crystallites embedded in a SiOx amorphous matrix phase.

In another embodiment of the invention, said SiOx/Si composite particles have a D50 particle size of no more than 10.0 μm, preferably no more than 5.0 μm, more preferably no more than 2.0 μm, still more preferably no more than 1.1 μm.

In yet another embodiment of the invention, said SiOx/Si composite particles have a D90 particle size of no more than 20.0 μm, preferably no more than 11.1 μm.

In still another embodiment of the invention, said SiOx/Si composite particles have a D10 particle size of no less than 0.1 μm, preferably no less than 0.3 μm.

Also provided is a process for producing a SiOx/Si/C composite material, wherein 0<x≤2, which comprises the steps of a) milling SiO powder together with a metal reductant in a molar ratio of 1.25:1-10:1, preferably 2:1-5:1, b) totally removing the oxidation product of said metal reductant to obtain SiOx/Si composite particles, c) coating said SiOx/Si composite particles with carbon to obtain said SiOx/Si/C composite material.

In an embodiment of the invention, said metal reductant is selected from the group consisting of Mg, Al, Zn, Li and the combination thereof.

Also provided is a SiOx/Si/C composite material produced by said process.

Also provided is an anode for lithium ion battery comprising said SiOx/Si/C composite material.

Also provided is a lithium ion battery comprising said anode.

BRIEF DESCRIPTION OF THE DRAWINGS

FIGS. 6 (A) and (B) show (a) the $N_2$ adsorption/desorption isotherm of the SiOx/Si composite according to an embodiment of the invention and (b) the pore size distribution plot calculated by the BJH formula in the desorption branch isotherm of the SiOx/Si composite, respectively.

DETAILED DESCRIPTION

Referring to the following description, examples and accompanying claims, other features, aspects and advantages of the present invention will be apparent.

Unless otherwise defined, all technical and scientific terms used herein have the same meaning as commonly understood by one of ordinary skill in the art to which this invention belongs. In case of conflict, the present specification, including definitions, will control.

When an amount, concentration, or other value or parameter is given as either a range, a preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

Unless stated otherwise, all percentages, parts, ratios, etc., are by weight.

The SiOx/Si/C Composite Material

On one aspect, the invention provides a SiOx/Si/C composite material, comprising SiOx/Si composite particles and a carbon coating layer coated on said SiOx/Si composite particles, wherein 0<x≤2.

As used herein, 0<x≤2 means that the Si atoms of SiOx exist in a valency of +4, +3, +2, +1 and the combination thereof.

Figure 1:
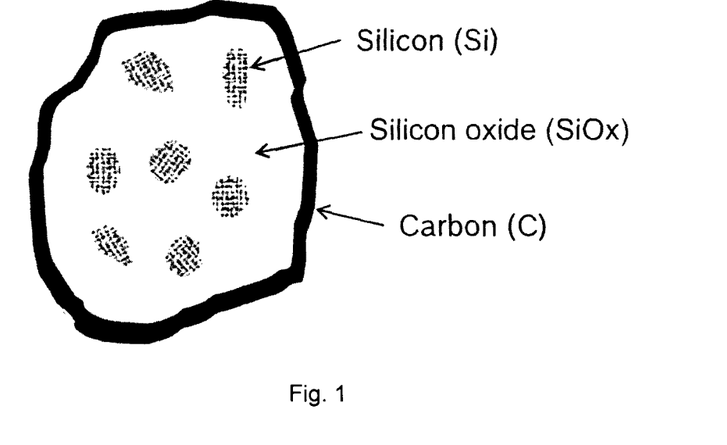
FIG. 1 shows the schematic structure of the SiOx/Si/C composite according to the invention.

The structure of the SiOx/Si/C composite material can be schematically illustrated as in FIG. 1. As shown in FIG. 1, the SiOx/Si composite particles comprise nano-silicon crystallites embedded in a SiOx amorphous matrix phase, and the nano-silicon crystallites are uniformly distributed in the SiOx amorphous matrix phase. In addition, the SiOx/Si particles are surrounded by a carbon coating layer.

In an embodiment of the invention, the SiOx/Si composite particles have a Si:O molar ratio of about 3:1-1.1:1, preferably about 2:1-1.2:1.

In another embodiment of the invention, the nano-silicon crystallites have a particle size of about 1-about 50 nm, preferably about 4-about 20 nm.

In another embodiment of the invention, the SiOx/Si/C composite material has a carbon coating layer with a thickness of about 2-about 15 nm, preferably about 4-about 12 nm, more preferably about 6-about 10 nm.

In still a further embodiment of the invention, the SiOx/Si composite particles may have a D50 particle size within the range of no more than 10.0 μm, preferably no more than 5.0 μm, more preferably no more than 2.0 μm, still more preferably no more than 1.1 μm. In addition, the D90 particle size of the SiOx/Si composite particles may be within the range of no more than 20.0 μm, preferably no more than 11.1 μm, and the D10 particle size may be within the range of no less than 0.1 μm, preferably no less than 0.3 μm.

As used herein, D50, D90 or D10 particle size refers to the particle diameter in case the cumulative distribution percentage reaches the specified value. For example, if D90=5 μm, there are 10% particles larger than 5 μm, and 90% smaller than 5 μm. The specified value, e.g. 50, 90 and 10 used herein may be by mass, weight, length, etc, depending on the test equipment and method used. Particularly, the D50, D90 and D10 particle sizes used herein are by volume, and they can be obtained by the commonly used volume averaged particle size distribution curve. In an embodiment of the invention, the SiOx/Si composite particles may have a particle distribution ranging from about 0.1-about 1000 μm.

The Process for Producing a SiOx/Si/C Composite Material

On another aspect, in order to arrive at the SiOx/Si/C composite material, the invention provides a process for producing a SiOx/Si/C composite material of the invention, wherein 0<x≤2, comprising:

a) milling SiO powder together with a metal reductant in a molar ratio of about 1.25:1-about 10:1, preferably about 2:1-about 5:1, b) totally removing the oxidation product of said metal reductant to obtain SiOx/Si composite particles, c) coating said SiOx/Si composite particles with carbon to obtain said SiOx/Si/C composite material.

In an embodiment of the invention, the metal reductant is selected from the group consisting of Mg, Al, Zn, Li and the combination thereof.

In another embodiment of the invention, during step a) the SiO powder is milled by a high energy ball milling process in advance for 0-about 15 h, and further milled together with said metal reductant for about 3-about 20 h.

In still a further embodiment of the invention, step C) is carried out by chemical vapor deposition or pyrolysis to achieve a carbon coating layer having a thickness of about 2-about 15 nm, preferably about 4-about 12 nm, more preferably about 6-about 10 nm.

Specifically, in an embodiment of the invention, the starting SiO powder in step a) may be commercially available or prepared from Si and $SiO_2$ at high temperatures according to the processes known in the prior art. The particle size of the starting SiO powder includes, but not limited to about 200 mesh to about 500 mesh, preferably about 200 mesh to about 400 mesh. Representative commercially available SiO powders can be commercially purchased from Aldrich (325 mesh) and Aladdin (200 mesh).

In an embodiment of the invention, the method for conducting milling includes, but not limited to ball milling. In a particular embodiment of the invention, the milling is conducted by high energy ball-milling (high energy mechanical milling) using a commercially available planetary balling mill including zirconica vial and hardened stainless vial. The operation parameters including the duration time, the rotation speed, the number and size of the zirconica balls or stainless steel balls of the ball mill may be adopted according to the instruction of the manufacturer, and a person skilled in the art can easily adjust these operation parameters of milling. In a particular embodiment of the invention, the SiO and reductant powder is milled in a planetary balling mill with 10 zirconia balls ($\varphi$=10 mm) at a rotation speed of about 300-about 500 rpm, preferably about 400-about 500 rpm for about 3-about 20 h, preferably about 5-about 15 h. In another embodiment of the invention, the SiO powder is pre-milled in a planetary balling mill at a rotation speed of about 400 rpm for about 0-about 15 h, preferably about 5-about 15 h in an alternative pretreatment step before step a).

The term "a reductant" used herein means a substance capable of reducing the higher oxidation states of silicon, e.g. $Si^{4+}$ to a lower state, and not negatively affecting in the milling process. In step a), the reductant used herein includes, but not limited to metals, such as Mg, Al, Zn, Li and the combination thereof. The molar ratio of SiO to the reductant may be in the range of about 1.25:1-about 10:1, preferably about 2:1-about 5:1. In a particular embodiment of the invention, the reductant is Mg, and thus the reaction between the reductant and the starting SiO powder can be assumed as follows:

SiO+Mg=MgO+Si.

In the case that Mg is used as the reductant, it is preferred that Mg is used in the form of powder having a particle size from about 50 to about 200 mesh, preferably from about 100 to about 200 mesh. The commercial available Mg powders can be commercially available from Sinopharm Chemical Reagent Co., Ltd (100-200 mesh) and from Aladdin (100-200 mesh). In a particular embodiment of the invention, the molar ratio of SiO to Mg was about 5:1.

In an embodiment of the invention, the treatment of totally removing the oxidation product of the reductant in step a) is conducted by immersing the oxidation product in an acid solution. The term "an acid solution" used herein means those dissolving the oxidized product of the reductant, but inert to SiO. Accordingly, the acid solution is selected from the solution of hydrochloric acid, perchloric acid, nitric acid, sulfuric acid, phosphoric acid and the combination thereof. Hydrofluoric acid will be avoided to use in the invention due to its possible reactivity in material containing Si. The acid solution may be in the form of diluted or concentrated solution, as long as it can dissolve the oxidized product of the reductant, e.g. MgO, $Al_2O_3$, ZnO and/or $Li_2O$. The concentration of the acid solution includes, but not limited to about 0.5 M-about 5 M, preferably about 1 M-about 2 M. In a particular embodiment of the invention, the acid solution will be a 2 M hydrochloric acid solution if the oxidized product of the reductant is MgO. The term "totally removing" used herein means that at least about 90%, preferably about 95%, more preferably about 99% of the oxidized product of the reductant is substantially dissolved and removed. The acid immersing period is not limited as long as such an amount of oxidized product can be removed. Preferably, the acid immersing period holds about 1-about 12 h, more preferably, about 4-about 6 h.

In an embodiment of the invention, after step b), the resulting mixture may be optionally washed by a washing reagent. The selection of the washing reagent is not limited, and it may include ethanol, deionized water or combinations thereof. Taking account of the ease to handle and cost-efficiency, in a particular embodiment of the invention, deionized water is used to wash off the dissolved salt produced in step b) from the SiOx/Si material.

In an embodiment of the invention, after the washing step, the washed SiOx/Si material may be optionally dried in order to obtain the final product. In the present invention, the method for conducting drying includes, but not limited to vacuum drying. In addition, the drying parameters, such as temperature and duration time can be easily adjusted by a person skilled in the art. Specifically, the drying temperature includes but not limited to about 50° C. -about 100° C. The drying duration may hold for about 4-about 12 h depending on the temperature used in the drying process. In a particular embodiment of the invention, the washed SiOx/Si material is vacuum dried at about 60° C. for about 10 h.

The carbon coating of an anode material for lithium ion battery has been demonstrated in the art to have many advantages, such as electrical conductivity, chemical and electrochemical stability, unique physical properties and low cost.

Therefore, in an embodiment of the invention, the SiOx/Si material obtained by the above process is further coated with a carbon-containing material in step c). There are various carbon coating methods known in the art, such as chemical vapor deposition (CVD) method, pyrolysis, etc. In an embodiment of the invention, the carbon source includes, but not limited to toluene, acetylene, polyvinyl chloride, polyvinylidene fluoride, citric acide, glucose, pitch and combinations thereof. In a particular embodiment of the invention, the coating process comprises substeps of 1) providing the SiOx/Si composite material obtained above in a reaction chamber, and 2) introducing a precursor gas having toluene into the reaction chamber, and maintaining a temperature at about 200° C.-about 1000° C. During the process, the coating duration includes, but not limited to about 0.3-about 2 h depending on the temperature used in the carbon coating process.

As a result, the process produces a SiOx/Si/C material which having a weight ratio of carbon to the sum of silicon monoxide and silicon is from about 5% -about 20%, and preferably from about 12.5%-about 20%. The carbon coating layer has a thickness of about 2-about 15 nm, preferably about 4-about 12 nm, more preferably about 6-about 10 nm.

The Method for Characterizing of SiOx/Si/C Composite Material

For better understanding the structure and more physical properties of the SiOx/Si/C composite material according to the invention, the inventors have conducted the following instrumental tests to characterize the SiOx/Si/C composite material produced in Examples.

The method for testing the atom ratio of Si/O is conducted by an energy dispersive spectrometer (EDS). In the invention, a transmission electron microscope (TEM, JEM-100CX, manufactured by JOEL) is used to conduct the test and calculate the atom ratio of Si/O.

Figure 2:
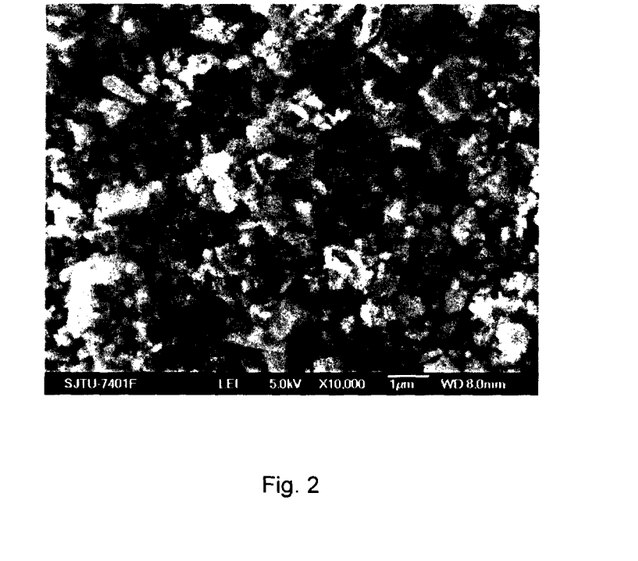
FIG. 2 shows the SEM image of the SiOx/Si/C composite according to an embodiment of the invention.

The SEM image as shown in FIG. 2 is obtained by FESEM, JEOL JSM-7401 F.

Figure 3:
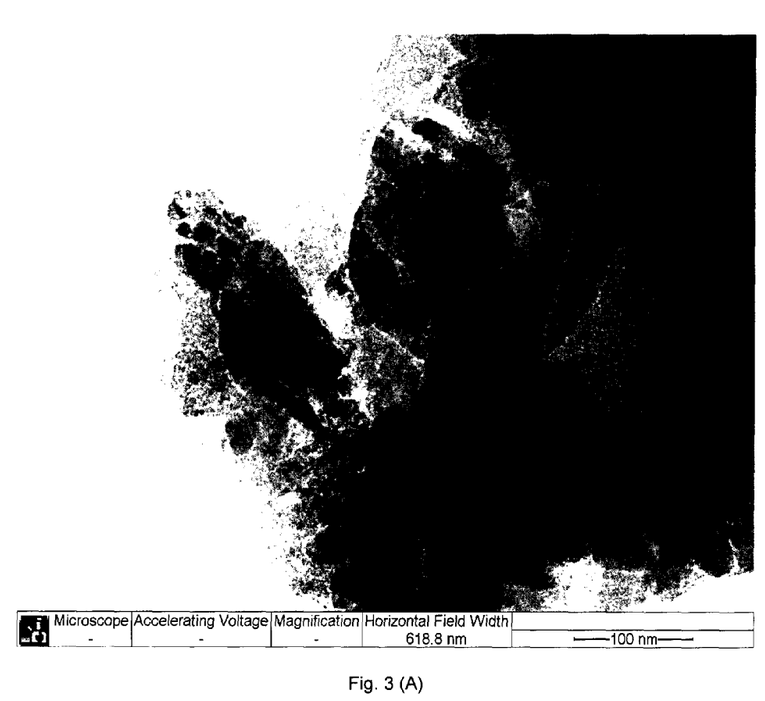
FIGS. 3A and 3B show TEM images of the SiOx/Si composite material according to an embodiment of the invention.
Figure 10:
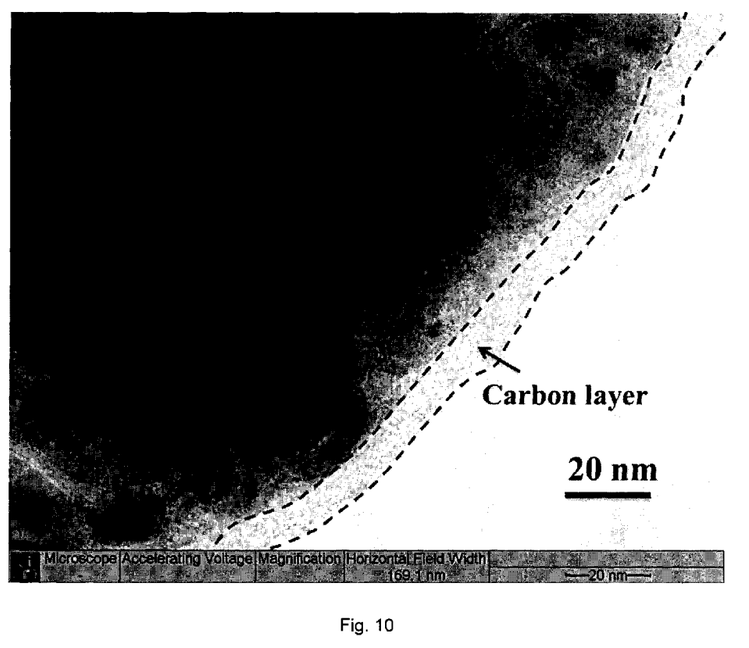
FIG. 10 shows the HR-TEM image of the SiOx/Si/C composite according to an embodiment of the invention.

The TEM images as shown in FIGS. 3 and 10 are obtained by JOEL JEM-100CX.

Figure 4:
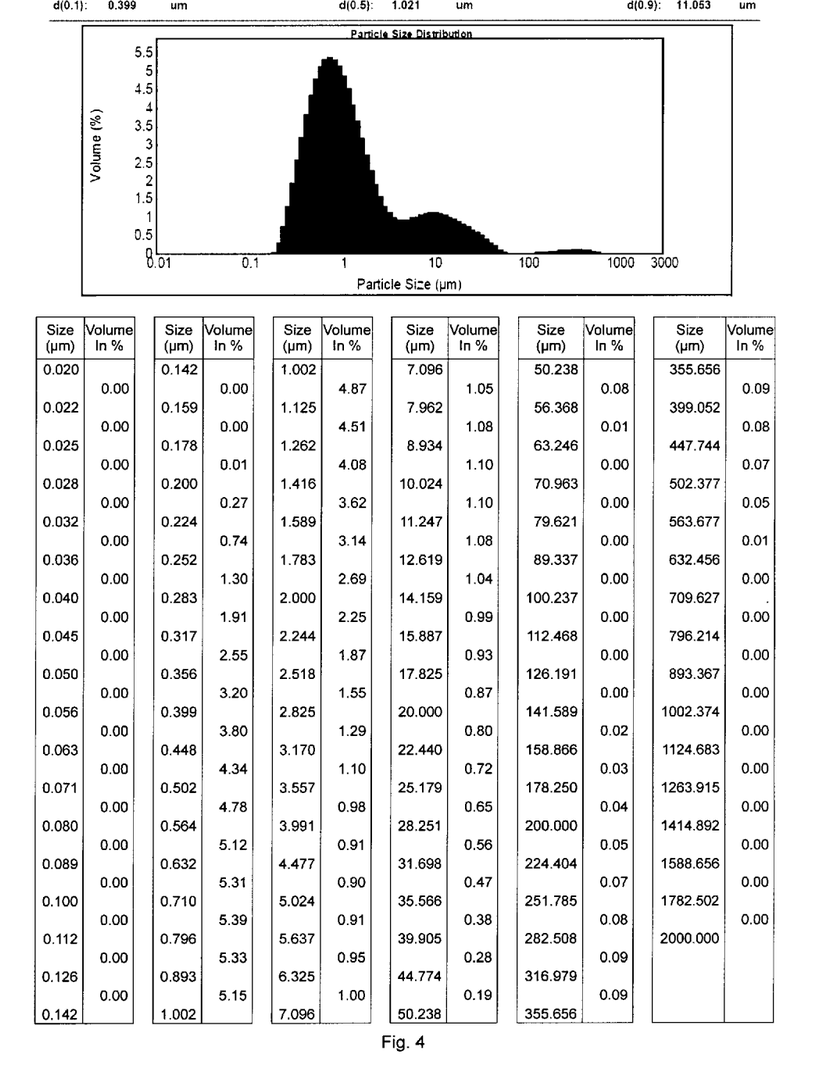
FIG. 4 shows the particle size distribution of the SiOx/Si composite according to an embodiment of the invention.

The particle size distribution of the SiOx/Si composite particles as shown in FIG. 4 is obtained by MASTERSIZER 2000.

Figure 5:
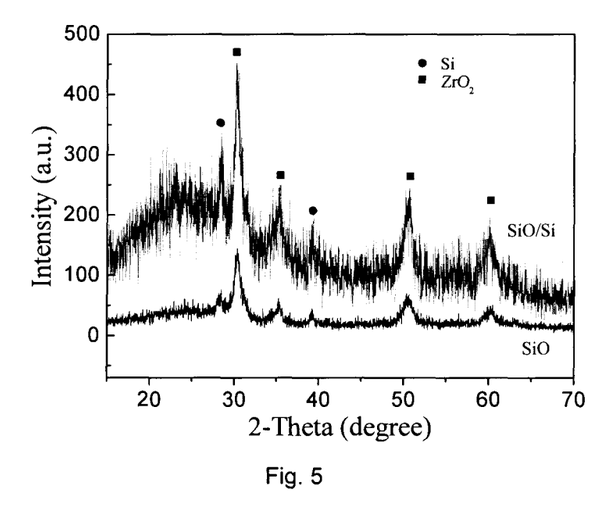
FIG. 5 shows the XRD profile of the silicon monoxide ball milled for 25 h (bottom) and SiOx/Si composite material according to an embodiment of the invention (upper).

The XRD profiles as shown in FIG. 5 are obtained by Rigaku D/max-2200/PC, Cu.

Figure 6:
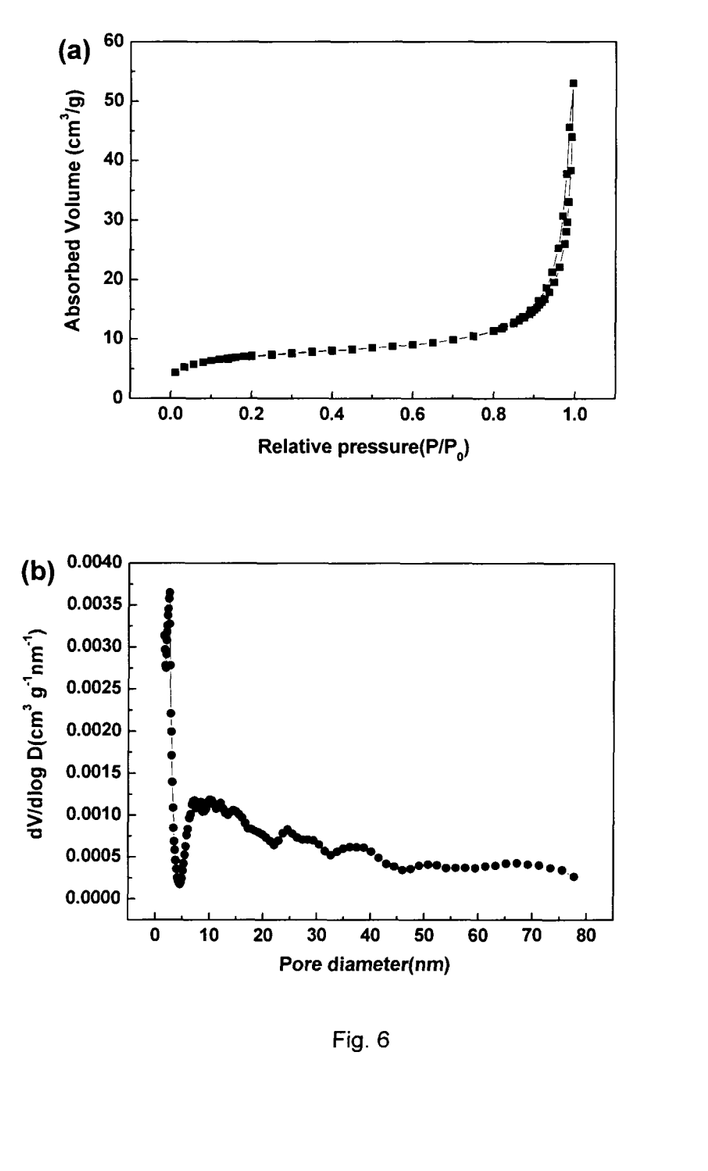

The pore size distribution and $N_2$ adsorption/desorption isotherm as shown in FIGS. 6 (A) and (B) are obtained by Brunauer-Emmett-Teller (BET) measurement, Micromeritics Inc ASAP 2010 M+C.

Figure 9:
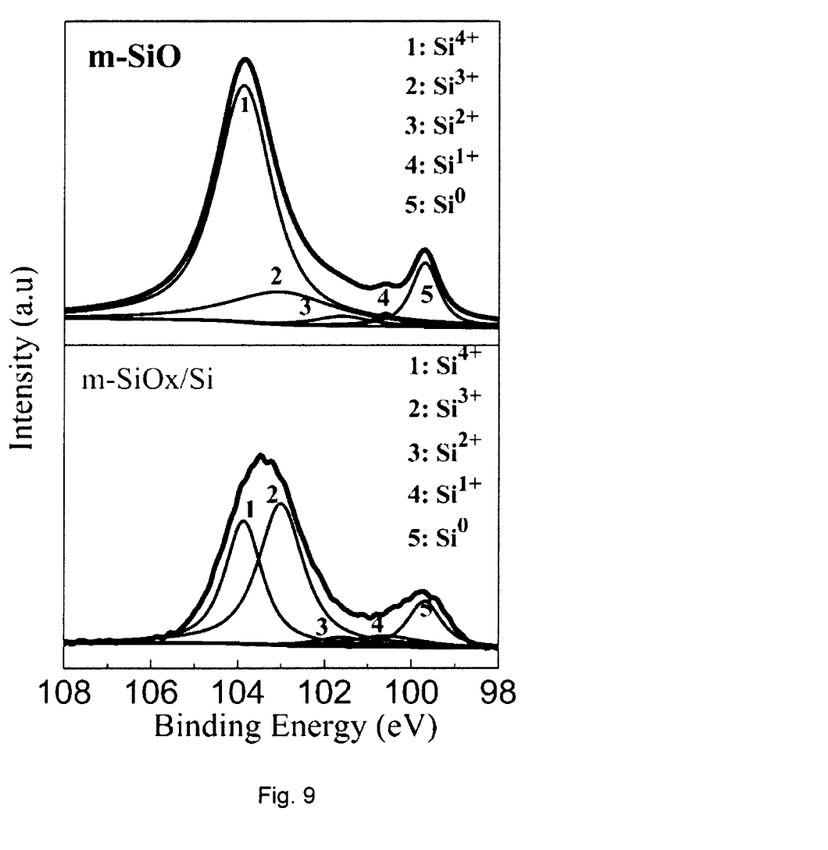
FIG. 9 shows the XPS spectra of the pristine SiO milled 10 h (m-SiO) and the SiOx/Si/C composite material according to an embodiment of the invention (m-SiOx/Si).

The XPS spectra as shown in FIG. 9 are obtained by Kratos Axis Ultra$^{DLD}$).

EXAMPLE

Example 1

The Production of SiOx/Si Composite Material

The SiOx/Si composite material was synthesized by high energy ball-milling process with a Planetary Mono Mill P-6 (Fritsch, Germany) at a rotation speed of 400 rpm for 25 h. 2.0 g of SiO (325 mesh, Aldrich) powder was placed in a 80 ml zirconica vial and ball milled with 10 zirconia balls ($\varphi$=10mm) for 10 h. Then 0.218 g of Mg powder (200 mesh, from Sinopharm Chemical Reagent Co., Ltd), was added and it was further ball milled for 15 h. As a result, the SiOx/Si/C composite material having a D50 particle size of about 1.0 μm, a D90 particle size of about 11.0 μm, and a D10 particle size of about 0.4 μm was obtained (as shown in FIG. 4). The obtained powder (SiOx/Si/MgO) was first immersed by 2 M HCl solution for 12 h to remove MgO, followed by washing with deionized water and finally vacuum dried at 60° C. for 10 h. As a result, the obtained SiOx/Si composite material has a Si:O molar ratio of about 1.25:1.

The Production of SiOx/Si/C Composite Material

The obtained SiOx/Si powder (0.2 g) was loaded in an alundum boat and placed at the center of a quartz tube furnace. Next, the precursor gas (argon and toluene) was introduced into the furnace. Then, the furnace temperature was increased from room temperature to 800° C. at a rate of 10° C. min$^{-1}$ and kept at 800° C. for 60 min. The furnace was cooled slowly to room temperature. At high temperature, the toluene decomposed quickly and deposited onto the surface SiOx/Si particles. As a result, the SiOx/Si/C composite material with a carbon coating having an average thickness of about 10 nm, which is shown in FIG. 10, was obtained. The coated carbon content in the composite was determined to be 12.5%.

Example 2

The SiOx/Si/C composite material was produced as in the same method used in Example 1, except that 2.0 g of SiO powder and 0.545 g of Mg powder were loaded in the ball-milling process. As a result, the obtained SiOx/Si composite material has a Si:O molar ratio of about 2:1.

Example 3

The SiOx/Si/C composite material was produced as in the same method used in Example 1, except that 2.0 g of SiO powder and 0.872 g of Mg powder were loaded in the ball-milling process. As a result, the obtained SiOx/Si composite material has a Si:O molar ratio of about 5:1.

Example 4

The SiOx/Si/C composite material was produced as in the same method used in Example 1, except that the furnace temperature was increased from room temperature to 800° C. at a rate of 10° C. min$^{-1}$ and kept at 800° C. for 90 min. As a result, the SiOx/Si/C composite material with a carbon coating having an average thickness of about 10 nm was obtained. The coated carbon content in the composite was determined to be about 15.2%.

Example 5

The SiOx/Si/C composite material was produced as in the same method used in Example 1, except that the furnace temperature was increased from room temperature to 800° C. at a rate of 10° C. min$^{-1}$ and kept at 800° C. for 30 min. As a result, the SiOx/Si/C composite material with a carbon coating having an average thickness of about 5 nm was obtained. The coated carbon content in the composite was determined to be about 5.6%.

Comparative Example 1

The SiO/C material was produced by coating the pristine SiO/C material with carbon as in the same method used in Example 1, but without ball milling and Mg powder addition. The as purchased SiO was directly loaded into an alundum boat and placed at the center of a quartz tube furnace for carbon coating.

Comparative Example 2

The SiO/C composite material was produced as in the same method used in Example 1, except that no Mg powder was charged in the ball-milling process. The as purchased SiO was loaded into milling machine and milled for 25 hours under 400 rpm. Then the product was loaded into an alundum boat and placed at the center of a quartz tube furnace for carbon coating.

Cell Assembling and Electrochemical Test:

The electrochemical performances of the as-prepared composites in Examples 1-5 and Comparative Examples 1 and 2 were tested using two-electrode coin-type cells. The working electrodes were prepared by pasting a mixture of active material, Super P conductive carbon black (40 nm, Timical) and styrene butadiene rubber/sodium carboxymethyl cellulose (SBR/SCMC, 3:5 by weight) as binder at a weight ratio of 70:20:10. After coating the mixture onto pure Cu foil, the electrodes were dried, cut to φ12 mm sheets, pressed at 3 MPa, and then further dried at 50° C. in vacuum for 4 h. The CR2016 coin cells were assembled in an argon-filled glove box (MB-10 compact, MBraun) using 1M LiPF$_6$/EC+DMC (1:1 by volume, ethylene carbonate (EC), dimethyl carbonate (DMC)) as electrolyte, including 2wt. % vinylene carbonate (VC), ENTEK ET20-26 as separator, and pure lithium foil as counter electrode.

Figure 7:
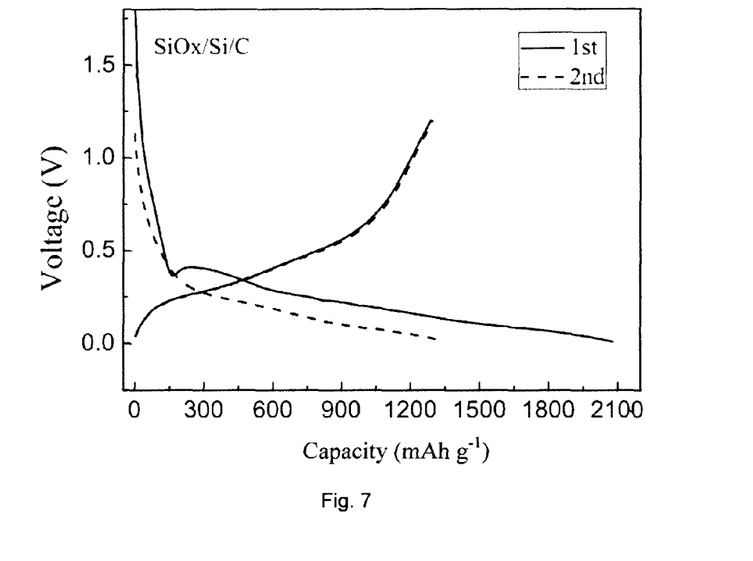
FIG. 7 shows the first two discharge/charge curves of SiOx/Si/C composite material according to an embodiment of the invention.
Figure 8:
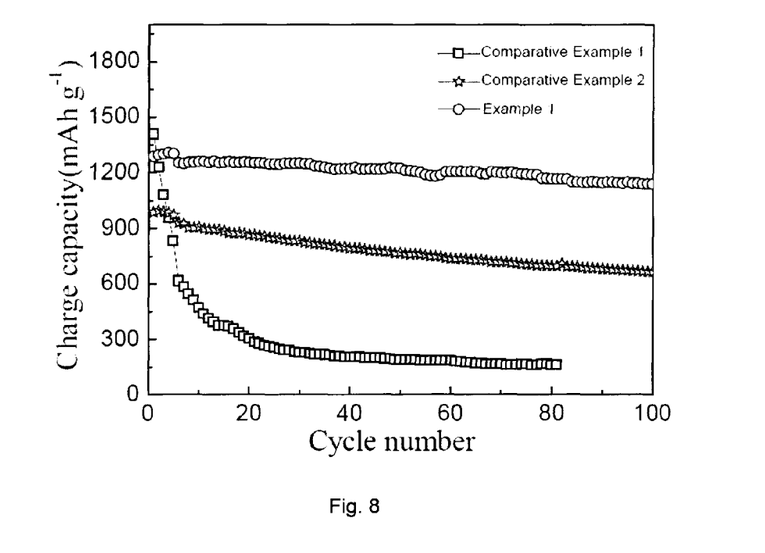
FIG. 8 shows the cycling performance of the pristine SiO/C, SiO/C ball milled for 25 h and SiOx/Si/C composite according to an embodiment of the invention.

The cycling performances were evaluated on a LAND battery test system (Wuhan Kingnuo Electronics Co., Ltd., China) at 25° C. with a current density of 100 mA g$^{-1}$ or 300 mA g$^{-1}$. The cut-off voltage was 0.01 V versus Li/Li$^+$ for discharge (Li insertion) and 1.2 V versus Li/Li$^+$ for charge (Li extraction). The test results are shown in FIGS. 7 and 8.

Evaluation:

As shown in FIG. 2, the particles of SiOx/Si/C composite according to Example 1 are small and distribute uniformly, which demonstrates the schematic structure shown in FIG. 1. In addition, Examples 2-5 also have the similar structures as that of Example 1.

In addition, as shown in FIGS. 3 (A) and (B), some crystallites can be found in the SiOx/Si/C composite of Example 1. They are within the sizes of 5-10 nm and were confirmed as silicon phases, assigned a Si (111) d-spacing value of 3.1 Å. Accordingly, silicon nanocrystallites embedded in an amorphous matrix phase, which further demonstrates the schematic structure shown in FIG. 1. In addition, Examples 2-5 have the similar structures as that of Example 1.

As shown in FIG. 5, the main diffraction peaks of SiO and SiOx/Si composite material in Example 1 are similar. SiO exhibited weak diffraction patterns of silicon phases from the disproportionation of SiO during the ball milling process. For SiOx/Si composite material in Example 1, the diffraction pattern of silicon increased. It is presumed that the SiO partially reacted with the Mg and was reduced to silicon nanocrystallites. In addition, a set of tetragonal ZrO$_2$ peaks after the ball milling are detected. The oxide contaminant must have come from the grinding medium (vial and ZrO$_2$ balls).

As shown in FIGS. 6 (A) and (B), the specific surface area of the SiOx/Si composite material in Example 1 is 24.5 m$^2$ g$^{-1}$. The pores are mainly obtained from the etching MgO reduction product.

FIG. 7 shows the first two discharge/charge curves of SiOx/Si/C composite material according to Example 1. The coin cell was discharged at 100 mA g$^{-1}$ between 0.01 and 1.2V vs Li/Li$^+$. As shown in FIG. 7, the first two discharge/charge curves of SiOx/Si/C composite at current density of 100 mA g$^{-1}$. The discharge and charge capacity of SiOx/Si/C composite is 2080 mAh g$^{-1}$ and 1286.8 mAh g$^{-1}$, respectively, with an initial Coulombic efficiency of 61.9% in the first cycle.

FIG. 8 shows the cycling performance of the SiO/C material according to Comparative Example 1, the SiO/C material according to Comparative Example 2 and the SiOx/Si/C composite material according to Example 1. The coin cell was discharged at 100 mA g$^{-1}$ for the five cycles and 300 mA g$^{-1}$ in the following cycles between 0.01 and 1.2 V vs Li/Li$^+$. As shown in FIG. 8, compared to the SiO/C material according to Comparative Example 1, the cycling performance of the SiO/C material according to Comparative Example 2 is increased. However, its reversible capacity is still relative low, only 900 mAh g$^{-1}$. Surprisingly, the reversible capacity of the SiOx/Si/C composite according to Example 1 is further improved from about 900 mAh g$^{-1}$ (Comparative Example 2) to over 1200 mAh g$^{-1}$ (Example 1).

Therefore, by the reduction reaction with Mg and coating with carbon, SiOx/Si/C anode according to Example 1 delivers better cycle stability and larger reversible capacity.

FIG. 9 shows the XPS spectra of the pristine SiO milled 10 h (m-SiO) and the SiOx/Si/C composite material according to Example 1 (m-SiOx/Si). Table 1 gives the abundance ratios for the Si oxidation states of Si 2p spectra for m-SiO and m-SiOx/Si.

TABLE 1

| Abundance ratios for Si oxidation states of Si 2p spectra with m-SiO and m-SiOx/Si. | | | | | |
|---|---|---|---|---|---|
| Sample | Si$^0$(%) | Si$^+$(%) | Si$^{2+}$(%) | Si$^{3+}$(%) | Si$^{4+}$(%) |
| m-SiO | 9.0 | 1.5 | 2.7 | 17.8 | 69.0 |
| m-SiOx/Si | 11.2 | 5.8 | 3.7 | 46.3 | 33.0 |

As shown in Table 1, compared to the pristine SiO milled 10 h, the abundance ratio of Si$^{4+}$ is significantly decreased while lower oxidation states, i.e. Si$^0$, Si$^+$, Si$^{2+}$ and Si$^{3+}$ are increased. Consequently, in the SiOx/Si/C composite material produced by the inventive process, the amount of Si in the higher oxidation state, i.e. Si$^{4+}$ has been reduced by the reductant, and the amount of Si in the lower oxidation states is increased, and thus improves the cycle stability and obtains a larger reversible capacity.

What is claimed is:

1. A process for producing a SiOx/Si/C composite material, wherein 0<x<2, said process comprising:
   milling SiO powder together with a metal reductant in a molar ratio of 1.25:1-10:1;
   totally removing the oxidation product of said metal reductant to obtain SiOx/Si composite particles; and
   coating said SiOx/Si composite particles with carbon to obtain said SiOx/Si/C composite material.

2. The process of claim 1, further comprising:
   selecting said metal reductant from the group consisting of Mg, Al, Zn, Li, and the combination thereof.

3. The process of claim 1, wherein during said milling said SiO powder is milled by a high energy ball milling process in advance for 0-15 h, and further milled together with said metal reductant for 3-20 h.

4. The process of claim 1, wherein said coating is carried out by chemical vapor deposition or pyrolysis to achieve a carbon coating layer having a thickness of 2-15 nm.

5. The process of claim 4, wherein said chemical vapor deposition or pyrolysis is conducted by using a precursor or carbon source selected from toluene, acetylene, polyvinyl chloridepolyvinylidene fluoride, citric acid, glucose, pitch, and the combination thereof.

6. The process of claim 1, wherein an SiOx/SiC composite material is produced.

* * * * *

UNITED STATES PATENT AND TRADEMARK OFFICE
CERTIFICATE OF CORRECTION

PATENT NO. : 9,972,836 B2
APPLICATION NO. : 14/787431
DATED : May 15, 2018
INVENTOR(S) : Yang et al.

Page 1 of 1

It is certified that error appears in the above-identified patent and that said Letters Patent is hereby corrected as shown below:

On the Title Page

In Item (57), the Abstract should read:
ABSTRACT
An SiOx/Si/C composite material, includes SiOx/Si composite particles and a carbon coating layer coated on the SiOx/Si composite particles. The SiOx/Si composite particles include nano-silicon crystallites embedded in an SiOx ($0<x\leq2$) amorphous matrix phase. The SiOx/Si composite particles have an Si:O molar ratio of 5:1-1.1:1, preferably 2:1-1.2:1. A process for producing an SiOx/Si/C composite material, includes a) milling SiO powder together with a metal reductant in a molar ratio of 125:1-10:1, preferably 2:1-5:1, b) totally removing the oxidation product of the metal reductant to obtain SiOx/Si composite particles, and c) coating the SiOx/Si composite particles with carbon to obtain the SiOx/Si/C composite material.

Signed and Sealed this
Eleventh Day of December, 2018

Andrei Iancu
*Director of the United States Patent and Trademark Office*